Figure 1:
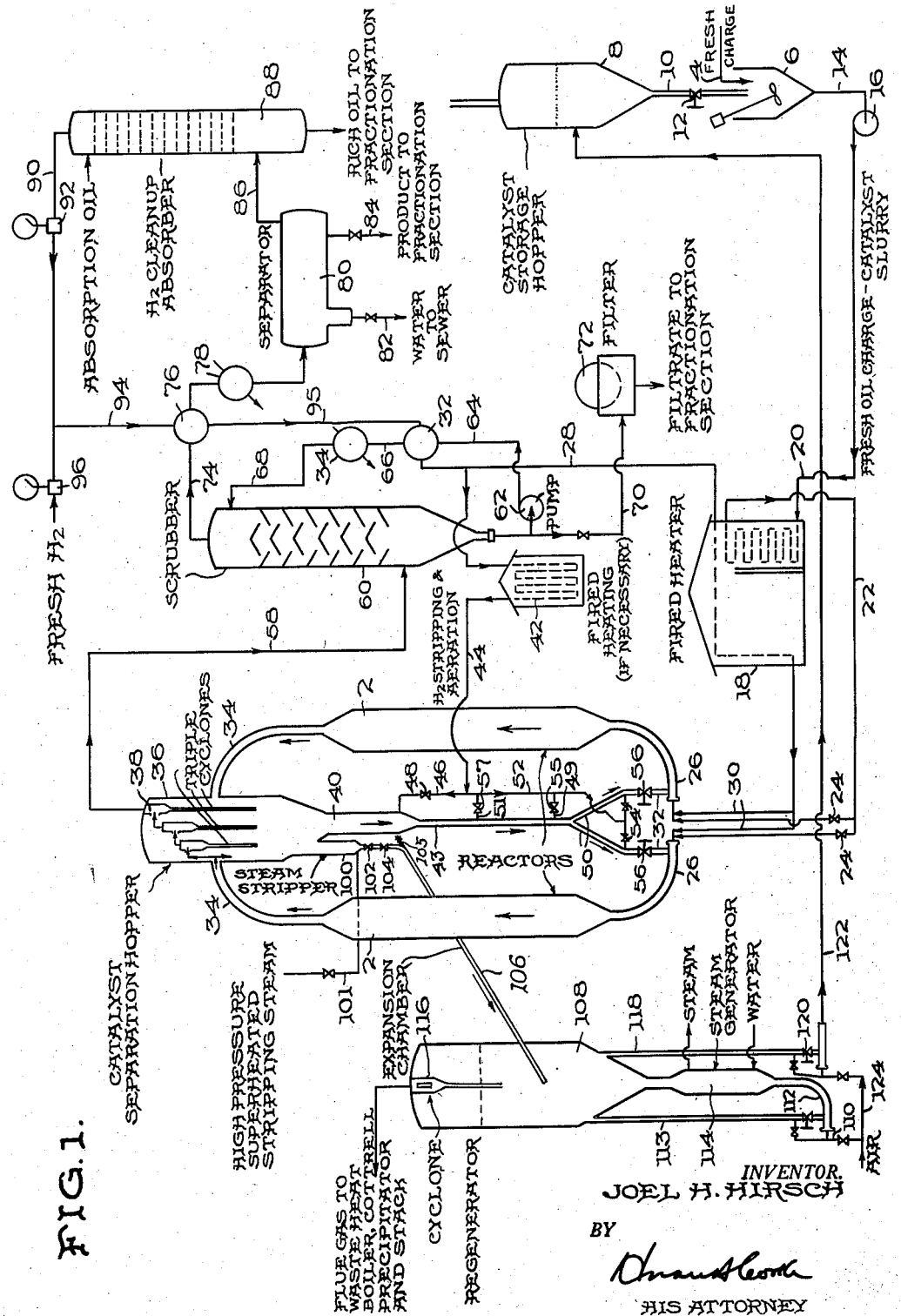

Aug. 12, 1958 — J. H. HIRSCH — 2,847,364
PROCESS FOR CONVERSION OF HYDROCARBONS AND
FOR TRANSPORT OF SOLID PARTICLES
Filed Sept. 12, 1952 — 2 Sheets-Sheet 1

INVENTOR.
JOEL H. HIRSCH
BY
HIS ATTORNEY

United States Patent Office 2,847,364
Patented Aug. 12, 1958

2,847,364

PROCESS FOR CONVERSION OF HYDROCARBONS AND FOR TRANSPORT OF SOLID PARTICLES

Joel H. Hirsch, Oakmont, Pa., assignor to Gulf Research & Development Company, Pittsburgh, Pa., a corporation of Delaware Application September 12, 1952, Serial No. 309,234

8 Claims. (Cl. 196—53)

This invention relates to improved procedure for treatment of hydrocarbons in the presence of hydrogen and for transporting solid particles from a high pressure system to a system at a substantially lower pressure.

It is of course well known that fluidized solids for catalytic and heat transfer purposes have come into extensive use in the last few years. For instance, fluidized catalysts are now widely used to replace fixed bed catalysts in catalytic cracking. Such catalysts are also used in reforming hydrocarbons with hydrogen. In such operations the catalyst remains at substantially the same pressure during the entire operation. The main reason for the wide use of fluidized solids is that they can be relatively easily transported from one chamber to another, i. e., when the fluidized particles are mixed with a gas or vapor they exhibit many of the properties of a liquid. In many catalytic operations conducted under pressure it is necessary or desirable to remove the catalyst to a much lower pressure zone to remove carbonaceous material therefrom or for other reasons. This is especially true in connection with hydroprocessing operations such as desulfurization, hydro-reforming and destructive hydrogenation of hydrocarbons at pressures of about 100 to 2000 p. s. i. g. at which carbon deposition is high. However, the use of fluidized technique in such processes where fluidized solids must be transferred between systems having large pressure differentials has not been extensive because of the problems encountered in the transferring operations. It is not entirely feasible merely to expand the fluidized solid from the high pressure to the lower pressure through a valve since this results in extensive abrasion of the relatively small area of the valve exposed to the highest velocity due to the abrasive characteristics of the solid particles.

My invention has for its object to provide an improved high pressure procedure for converting hydrocarbons in the presence of hydrogen and a fluidized catalyst.

Another object is to provide improved procedure for destructively hydrogenating heavy hydrocarbons to lower boiling hydrocarbons utilizing fluidized bed technique.

A still further object is to provide a process whereby the regeneration requirement of a hydroprocessing operation utilizing a fluidized catalyst is markedly reduced.

Another object is to provide a continuous fluid catalytic process for treatment of hydrocarbons with hydrogen under pressure whereby fluid catalyst can be removed from the pressure system with facility.

Another object is to provide improved procedure for transporting solid particles in suspension from a high pressure chamber or system to a chamber or system at a substantially lower pressure.

Another object is to avoid the extensive abrasion of slide valves heretofore used in controlling the flow of fluidized solids from a high pressure system to a substantially lower pressure system.

These and other objects are accomplished by my invention which includes a cyclic catalytic operation in which a hydrocarbon is converted in the presence of hydrogen by passing vapors of the hydrocarbon together with particles of hydrogenating catalyst and hydrogen upwardly through a reaction chamber under conditions of temperature and pressure which result in conversion of the hydrocarbon. A mixture of the treated hydrocarbon vapors, unreacted hydrogen and catalyst particles is removed from the top of the reaction chamber and the so-removed catalyst particles are separated from the treated hydrocarbon vapors and hydrogen. The separated catalyst particles are contacted, without removal from the high pressure system, with hydrogen at a temperature causing destructive hydrogenation of the carbonaceous material deposited on the catalyst particles. The hydrogen treated catalyst particles, fresh hydrocarbon vapors and hydrogen are again passed through the reaction chamber. Part of the catalyst particles are removed from the high pressure system by expansion in the presence of flow regulating gas or vapor, regenerated at lower pressure and returned to the higher pressure system for re-use.

My invention also includes a process for transporting solid particles comprising passing a suspension of solid particles in a gas or vapor from a high pressure system or chamber into an elongated confined passageway. A flow regulating gas or vapor is introduced into this passageway to regulate the density of the suspension of solid particles. The combined mixture is permitted to flow through the elongated confined passageway substantially entirely by the force exerted by the high pressure in the high pressure system or chamber. The pressure decreases moderately as the suspension flows through the elongated confined passageway by the friction between the walls of the passageway and the suspension of solid particles. The suspension is removed from the other end of the passageway and into the lower pressure system, most of the pressure reduction taking place beyond the end of the passageway.

In the following examples and description I have set forth several of the preferred embodiments of my invention but it is to be understood that they are given by way of illustration and not in limitation thereof.

Figure 2:
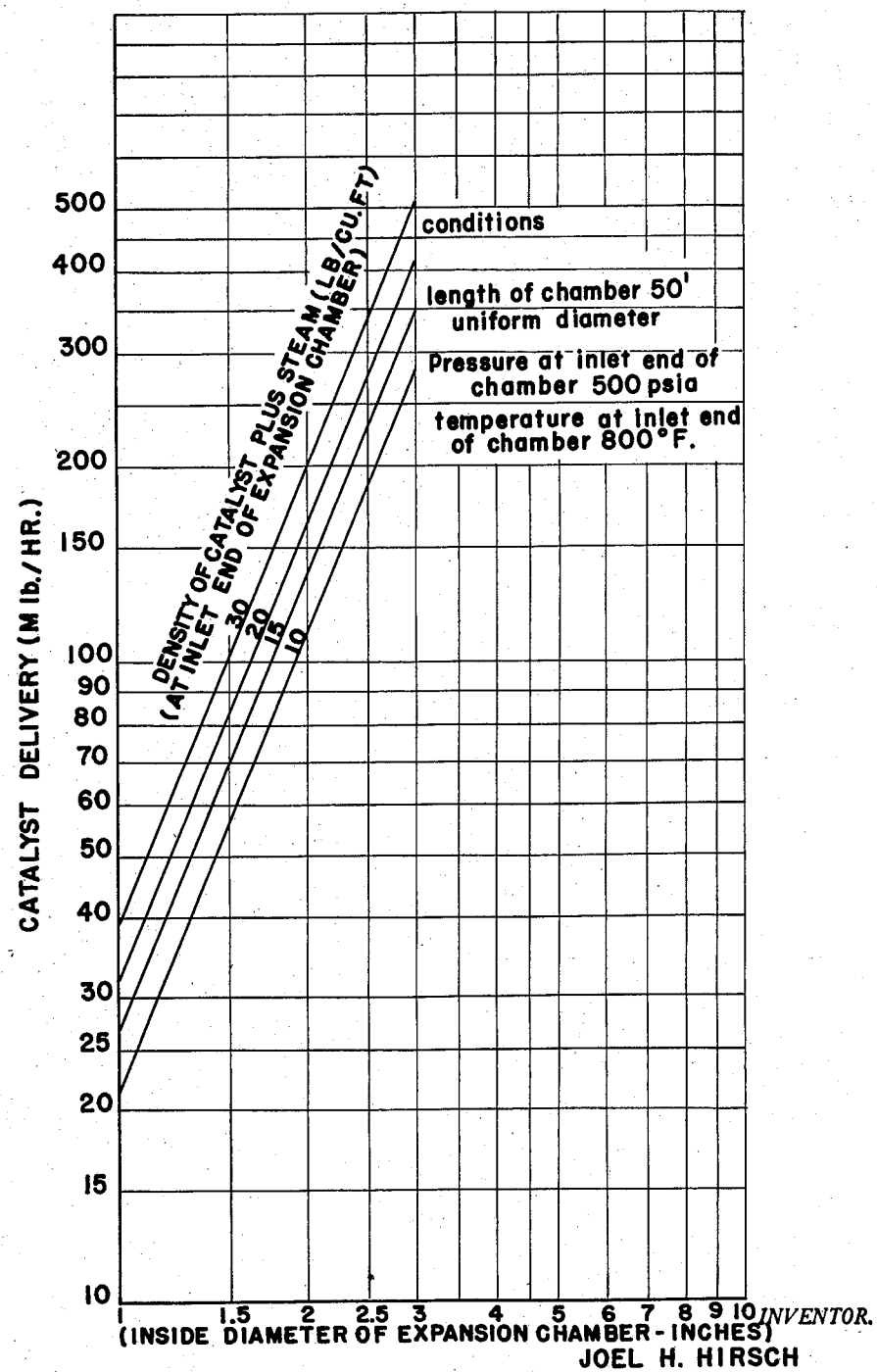

In the accompanying drawings wherein like numbers refer to like parts, Fig. 1 illustrates a diagrammatic elevation partly in section of one form of apparatus in which my invention may be carried out, and; Fig. 2 is a graph illustrating the capacity at which solid particles can be transported between pressure differentials in accordance with my invention.

Referring to Fig. 1, numeral 2 designates a plurality of reactors which are connected in parallel and are operated simultaneously. For convenience I will describe destructive hydrogenation as being carried out in these reactors in accordance with my invention. A heavy hydrocarbon to be destructively hydrogenated is introduced into the system through conduit 4 and is mixed with fresh or regenerated catalyst in mixer 6. This catalyst is derived from storage hopper 8 and flows into mixing vessel 6 through conduit 10 at a rate controlled by slide valve 12.

The slurry of catalyst and hydrocarbon oil is removed from vessel 6 through conduit 14 by pump 16 and is delivered to heater 18 through conduit 20. The heated mixture then flows through conduit 22 and valves 24, into the lower portion of mixing conduits 26. These conduits connect with the lower portion of reactors 2 as illustrated. A stream of hydrogen is introduced into heater 18 through conduit 28. The heated hydrogen then flows through conduits 30 into the lower end of mixing conduits 26. Hydrogen treated catalyst is also introduced into the lower portion of mixing conduits 26 through conduits 32. There is thus formed in mixing conduits 26 an upwardly flowing stream of hydrogen, hydrocarbon vapors, catalyst and liquid hydrocarbon absorbed on the catalyst. The rate of travel of this mixture through conduits 26 is higher than the rate of travel through reactors 2. This rate of travel is greater than the rate of travel of any substantial amount of the catalyst particles in a reverse direction as a result of gravitational effects. Therefore, the components of the mixture are thoroughly intermixed and prevented from returning for further charge of liquid portions of the hydrocarbon. Rapid passage of catalyst past the point of introduction of hydrocarbon is desirable in order to pick up the liquid portion of the hydrocarbon and remove it as fast as it is introduced, thus reducing the probability of agglomeration and enabling the catalyst to carry a large amount of feed into the reactor. This expedient is especially desirable when charging heavy hydrocarbons partly in liquid phase. However, it is also advantageous with lighter charge stock. The mixture then flows upwardly into reactors 2, which reactors are of such size as to permit the desired reaction time. The linear velocity in these reactors is selected to permit hindered settling of the catalyst and result in a dense phase of catalyst analogous to the conditions in the reactor of a fluid catalytic cracking unit. Since the hydrocarbon vapors and hydrogen are introduced into the reactors at high pressure and high temperature, destructive hydrogenation of the hydrocarbon takes place during passage through the reactors. If the hydrocarbon contains sulfur compounds these will be converted into hydrogen sulfide, i. e., simultaneous conversion to lower boiling point hydrocarbons and desulfurization will take place.

The catalyst together with reaction products and hydrogen are removed from the top of the reactor as in "upflow" fluid catalytic cracking. The catalyst is removed from the top at the same rate as it is added at the bottom. The effluent from the reactors, i. e., the suspension of catalyst in hydrogen and hydrocarbon vapors then flows upwardly through conduits 34 and thence into catalyst separation hopper 36 which serves the entire number of reactors connected thereto. Part of the catalyst contained in the effluent separates from the hydrogen and hydrocarbon vapors as the suspension flows into separation hopper 36. This separated catalyst falls downward into the bottom of hopper 36. The remainder is carried by the stream of hydrogen and hydrocarbon vapors into a set of triple cyclone separators 38 which separate substantially all of the catalyst contained in the hydrogen and hydrocarbon vapors, returning it to the bottom of spearation hopper 36. The separated catalyst flows downward through a hydrogen treating section 40 connected with the lower part of catalyst separation hopper 36. In chamber 40 the catalyst, which is still at approximately the same temperature and pressure as existed in reactors 2, is treated with hot hydrogen, which hydrogen is heated in heater 42 and is introduced by way of conduits 28, 44, 46 and valve 48. The catalyst is maintained in a fluidized condition in hydrogen treating chamber 40 and the coke and hydrocarbon polymers contained thereon are converted into useful hydrocarbons by destructive hydrogenation. These hydrocarbons together with the hydrogen flow up into hopper 36 and thence into conduit 58.

The use of a single cyclone separator in conjunction with a plurality of reactors is advantageous since it reduces the cost of equipment and cost of operation. Although my invention is not limited to the use of a plurality of reactors served by one catalyst separator this constitutes a preferred embodiment. Usually a nest of four reactors can be economically serviced by one large triple cyclone separator.

The hydrogen treated catalyst then flows downward through standpipe 43 wherein it is kept in a fluidized condition by hydrogen introduced into forked legs 50 constituting branches of the lower portion of standpipe 43 and into conduits 49 and 51. There is one leg or fork 50 for each reactor. This hydrogen is introduced into legs 50 and conduits 49 and 51 through conduit 52 and valves 54, 55 and 57. The hydrogen treated suspension of catalyst is then introduced into mixing conduits 26 at a rate controlled by slide valves 56.

Only a very small amount of the catalyst is carried overhead through the cyclones 38 with the gas and oil vapor. This is carried through line 58 and is removed in a scrubbing tower 60. Scrubbing tower bottoms are pumped by pump 62 through lines 64, 66 and 68, heat exchanger 32 and cooler 34 to the top of tower 60 as wash oil. A small stream of bottoms is removed through line 70 to a filter 72 which recovers catalyst fines. The filtrate goes to the hydrocarbon product fractionation section (not shown). The overhead from scrubber 60 passes through line 74, heat exchanger 76 and cooler 78 to separator 80 where water from steam condensation is removed through line 82. Treated oil is withdrawn through line 84 to the fractionation section (not shown). The gas off the top of the separator 80 passes through line 86 to a hydrogen clean-up absorber 88 where light hydrocarbons are removed by absorption oil. Gas from the top of the absorber is removed through line 90 compressed in a recycle gas compressor 92 and combined in conduit 94 with fresh hydrogen from compressor 96 for delivery to the reaction system. The combined hydrogen gas streams pass through heat exchanger 76 in the scrubber vapor line, then through exchanger 32 on the scrubber wash oil line and thence into the radiant section of the fired heaters 18 and 42 by way of conduit 28.

A minor amount of the catalyst will require regeneration. This is accomplished by removing catalyst from the separation hopper 36 downward through a steam stripping leg 100 into which stripping steam is introduced through conduit 101. The stripped catalyst then flows through two slide valves, 102 and 104 and thence into expansion chamber 106, which will be described subsequently, into a regenerator 108 operating at substantially atmospheric pressure. The catalyst is regenerated with a stream of air introduced through conduit 110. This air passes upwardly with fluidized recycle catalyst through conduit 112, catalyst cooler 114 and thence into regenerator 108. The heat formed in the regenerator is removed by catalyst circulation through a recycle catalyst cooler-steam generator, this circulated catalyst being removed downwardly through standpipe 113 in which it is maintained in a fluidized condition by means of air introduced through conduit 110. The flue gas from the regenerator flows through a cyclone 116 in the top of the vessel and then through a waste heat boiler (not shown), Cottrell precipitator (not shown) for recovery of catalyst fines, and thence into a flue gas exhaust stack. Catalyst from the regenerator flows downward through a standpipe 118 and slide valve 120 to a line 122 which transports it to catalyst storage hopper 8 by means of air introduced through conduit 124. Makeup fresh catalyst is added periodically to storage hopper 8, as needed.

The system for removing catalyst from hopper 36 to regenerator 108 will now be discussed in greater detail. As indicated, catalyst flows downward through stripper 100 where high pressure superheated steam or other stripping gas introduced through conduit 101 strips the catalyst to be withdrawn for regeneration. The catalyst then flows through the slide valves, 102 and 104 which do not control flow during use but are employed during starting and stopping operations. Expansion chamber 106 is designed to take part of the pressure drop as a result of expansion and frictional resistance to flow of the suspension therethrough. The remaining expansion would take place upon introduction into regenerator 108.

High pressure steam is introduced into expansion chamber 106 through conduit 105. The purpose of the steam introduced through conduit 105 is to adjust the density of the suspension of solid particles in expansion chamber 106. A gas or vapor other than steam may be employed for this purpose. The larger the amount of steam introduced through conduit 105, the lower will be the amount of solid particles in suspension in conduit 105, i. e. the steam can be used to control the rate of flow of catalyst into and through the expansion chamber. The pressure of the gas or steam introduced through conduit 105 is below the pressure existing in closed chamber 100.

The mixture of added steam and the suspension of solid particles then flows through expansion chamber 106. During such flow a moderate amount of the pressure drop takes place due to friction between the walls of the expansion chamber and the suspension. The suspension then passes from the end of the expansion chamber into regenerator 108 which is at a substantially lower pressure than closed chamber 100. Most of the pressure drop results from expansion taking place beyond the end of the expansion chamber, much like that which occurs beyond the nozzle of a fire hose.

The data given in Fig. 2 illustrate the amount of catalyst flowing through an expansion chamber from a pressure of 500 pounds per square inch and expanding to atmospheric pressure at a temperature of 800° F. at the inlet end of the expansion chamber. These data are on the basis of an expansion chamber 50 feet in length and of uniform diameter. The graph is on a logarithmic scale, the catalyst delivery rate being given in terms of thousands of pounds per hour on the vertical axis and the diameter of the expansion chamber being given in inches on the horizontal axis. The fact that the expansion chamber can adequately handle most solid particle transfer problems encountered at moderately high pressures will be apparent from the data presented in Fig. 2 when one considers that the catalyst withdrawal rate for a 20,000-barrel per day destructive hydrogenation unit would be about 70,000 pounds per hour. From the graph it will be apparent that an expansion pipe of uniform diameter of 1½ inches would be adequate for this purpose. Shortening the length of the expansion chamber to less than 50 feet would result in less reduction in pressure and a higher delivery rate for a given diameter. However, such a shorter expansion chamber would be satisfactory where the pressure reduction required is less than that indicated in the graph. Lengthening the expansion chamber would result in greater pressure reduction and lower delivery rate and would be useful where higher pressure differentials are encountered. My invention is not limited to any particular length or diameter of expansion chamber. It will be noted from the graph that increasing the amount of steam introduced into the expansion chamber decreases the amount of catalyst delivered through the expansion chamber. The amount of steam introduced can be varied to give practically any solid particle delivery rate.

One of the chief advantages of my invention is that valves to control the rate of flow of solid are unnecessary. The use of a valve for such control is undesirable because of the exceedingly high rate of abrasion in a localized area. By varying the amount of steam or other gas introduced under pressure into the expansion chamber, the rate of flow of solid particles can be effectively controlled without other controlling devices.

Catalyst is shown as being returned as a slurry in the fresh charge. It might not be desirable to wet the fresh catalyst with the oil in the absence of hydrogen in the case of heavy crudes containing large amounts of residual components. In this case the catalyst could be returned to the reaction system in a slurry of light clean oil from the fractionation section, the slurry being pumped into the catalyst separation hopper. This would produce an additional vapor load on the cyclones and fractionating equipment but would be small in comparison with the amount of recycle gas that would be normally handled. While it is believed that a slurry is the best means of introducing the catalyst into the reaction system, other known means can be employed. For instance lock hoppers of known design can be used for this purpose. Also "Fuller-Kinyon" pumps can be used to introduce catalyst into the high pressure system. Alternatively, several stages of standpipes connected in series to build up the pressure on a fluidized catalyst can be used to introduce catalyst into a pressure system. See for instance U. S. Patent 2,311,564.

The linear velocity in the up flow reactor will be determined by the time of contact required between the catalyst and reaction vapors and the economic limitations on the size of apparatus required to give the desired contact time. Also catalysts used for destructive hydrogenation, hydroforming, etc. are relatively heavy, i. e., they have a heavy hydrogenating component in varying amounts dispersed on the surface of or otherwise composited with a porous carrier. Although linear velocity in the reactor cannot be defined because of these variations, it can be said that it generally will be between about 0.3 and 1.0 ft./sec. for most hydrogenating catalysts.

The other conditions employed in the reactor are those conventional for hydroprocessing operations such as destructive hydrogenation, hydroforming, hydrodesulfurization, etc. Pressures of about 250 to 2000 p. s. i. are employed in all such processes. The temperature generally will be between about 750° and 950° F. and a hydrogen to oil ratio of between about 1000 and 20,000 cubic feet per barrel of oil will be used depending of course on the reaction in question. Any hydrogenation catalyst can be employed. However, I prefer to use a hydrogenation catalyst such as iron group metals, group VI left-hand column metals or their oxides or sulfides or combinations thereof supported on a porous carrier such as kieselguhr, "Alfrax," silica gel, etc. I prefer to employ an alumina carrier.

The treatment with hydrogen in chamber 40 does not usually require as long a contact time as the treatment in the reactor. Therefore, the chamber for the hydrogen treatment can be smaller than the reactor. The pressure in the hydrogen treating chamber will be essentially the same as that in the reactor since they communicate with each other. The temperature in this treatment preferably will be between 750° and 950° F. although higher temperatures can be used. The amount of hydrogen will be between about 2 and 3 volumes per volume of catalyst at operating conditions. The contact time in the chamber 40 will generally vary between about 30 and 60 seconds, depending on the nature of the hydrocarbon treated and the conditions employed in the primary reaction chamber.

During the entire cycle the catalyst particles are exposed to a pressure substantially the same as that existing in the reaction chamber, i. e., the cyclone separators, the hydrogen treating chamber and the reaction chamber are all at about the same pressure and communicate with each other. Therefore the catalyst activity is maintained at a high level without withdrawing catalyst from the high pressure system and without interruption of the conversion operation. Furthermore, the catalyst particles need not be cooled and reheated in order to accomplish the coke removal. They can be and preferably are circulated in the system in the manner indicated without change in temperature excepting that which may be required to lower the temperature in the event of excessive release of heat during the hydrogenation.

My invention does not entirely remove the necessity for regeneration of the catalyst. However, by hydrogen treating the catalyst before it has repeatedly contacted the hydrocarbon charge much of the deposit formed on the catalyst is easily removed by mere hydrogenation. Therefore, operation in accordance with my invention greatly reduces the regeneration requirement. It is advantageous to withdraw, for regeneration, a small part of the catalyst which has already been treated with hydrogen as described in detail above. By operating in this manner much of the carbonaceous deposit on the catalyst is converted by the hydrogen treatment into useful hydrocarbons instead of being burned in the regenerator and the regeneration requirement is reduced.

It is advantageous, especially when treating heavy hydrocarbons, to employ a high catalyst to oil ratio, preferably in the range between 10:1 and 25:1 by weight. With these high ratios the hydrocarbon is spread over a relatively large volume of catalyst and this helps to reduce coking or agglomeration. Since most of the catalyst will be that which has been merely hydrogen purged and only a small amount of it will be freshly regenerated catalyst the use of such high catalyst to oil ratios is not uneconomical. The ratio of regenerated catalyst to recirculated (hydrogen treated) catalyst will depend on the amount of coke deposited which in turn is determined by the nature of the hydrocarbon treated and the type of hydrogen treatment procedure carried out in the reactor. The ratio will generally be very low (such as between 1:30 and 1:10 by weight) since the hydrogen treatment markedly reduces the amount of regeneration required.

What I claim is:

1. A cyclic catalytic operation for converting a hydrocarbon in the presence of hydrogen wherein the catalyst, during each cycle, is treated with hydrogen to remove carbonaceous deposits therefrom, and wherein recycled catalyst is maintained at substantially the same pressure during the cyclic operation which process comprises passing particles of hydrogenating catalyst which are suspended in vapor of the hydrocarbon and hydrogen into the lower part of a reaction chamber maintained under elevated pressure, removing treated hydrocarbon vapors and unreacted hydrogen together with catalyst particles from the upper part of the reaction chamber, separating these removed catalyst particles from the treated hydrocarbon vapors and hydrogen, treating at least part of the separated catalyst particles with hydrogen at a temperature which will cause destructive hydrogenation of carbonaceous material deposited on the catalyst particles, passing hydrogen treated catalyst particles together with fresh vaporized hydrocarbon and hydrogen through said reaction chamber, passing part of the separated catalyst particles into one end of a conduit communicating with a regenerator at a substantially lower pressure, adjusting the density of the particles in the conduit by introducing gas under pressure into the conduit, maintaining the catalyst particles suspended in the gas during the entire period of passage through the conduit, removing the catalyst particles from the other end of the conduit, regenerating these catalyst particles and returning them to the reaction chamber for re-use in the process.

2. A cyclic catalytic operation for converting a hydrocarbon in the presence of hydrogen wherein part of the catalyst is recycled while it is at all times within a closed system at elevated pressure and wherein the catalyst, during each cycle, is treated with hydrogen to remove carbonaceous deposits therefrom, which process comprises introducing particles of hydrogenating catalyst which are suspended in vapor of the hydrocarbon and hydrogen into the lower part of a reaction chamber under elevated pressure, removing treated hydrocarbon vapors and unreacted hydrogen together with catalyst particles from the top of the reaction chamber, separating these removed catalyst particles from the treated hydrocarbon vapors and hydrogen, treating a portion of the separated catalyst particles with hydrogen at a temperature which will cause destructive hydrogenation of carbonaceous material deposited on the catalyst particles, again passing these catalyst particles and fresh hydrocarbons together with hydrogen through said reaction chamber, removing another portion of the catalyst particles from the closed system by passing them into one end of a conduit which communicates at its opposite end with a regenerator, introducing gas into the conduit to adjust the density of the solid particles, maintaining the solid catalyst particles suspended in the gas during the entire period of passage through the conduit, directing the opposite end of the conduit downward into a fluid bed of catalyst in the regenerator, regenerating the catalyst particles by combustion at approximately atmospheric pressure and reintroducing these regenerated catalyst particles into the reaction chamber.

3. A cyclic catalytic operation for converting a hydrocarbon in the presence of hydrogen wherein the catalyst, during each cycle, is treated with hydrogen to remove carbonaceous deposits therefrom, which process comprises introducing between 10 and 30 parts by weight of particles of hydrogenating catalyst suspended in hydrogen and one part of vaporized hydrocarbon into the lower part of a reaction chamber under elevated pressure, removing treated hydrocarbon vapors and unreacted hydrogen together with catalyst particles from the top of the reaction chamber, separating these removed catalyst particles from the treated hydrocarbon vapors and hydrogen, treating at least part of the separated catalyst particles with hydrogen at a temperature which will cause destructive hydrogenation of carbonaceous material deposited on the catalyst particles, again passing these catalyst particles and fresh hydrocarbon together with hydrogen through said reaction chamber in the manner specified above, maintaining the recycled catalyst particles during the entire cyclic operation at substantially the pressure which exists in the reaction chamber, passing part of the separated catalyst particles into one end of a conduit communicating with a regenrator at a substantially lower pressure, adjusting the density of the particles in the conduit by introducing gas into the conduit, maintaining the catalyst particles suspended in the gas during the entire period of passage through the conduit, removing the catalyst particles from the other end of the conduit, regenerating these catalyst particles and returning them to the reaction chamber for re-use in the process.

4. A cyclic catalytic operation for converting a hydrocarbon in the presence of hydrogen wherein part of the catalyst is recycled while it is at all times within a closed system at elevated pressure and wherein the catalyst, during each cycle, is treated with hydrogen to remove carbonaceous deposits therefrom, which process comprises simultaneously introducing particles of hydrogenating catalyst suspended in vapor of the hydrocarbon and hydrogen into the lower part of a plurality of reaction chambers maintained under elevated presure, removing treated hydrocarbon vapors and unreacted hydrogen together with catalyst particles from the top of each of the reaction chambers, combining these removed streams of effluent, separating the removed catalyst particles from the treated hydrocarbon vapors and hydrogen in the combined stream, treating a portion of the separated catalyst particles with hydrogen at a temperature which will cause destructive hydrogenation of carbonaceous material deposited on the catalyst particles, again passing these catalyst particles and fresh hydrocarbon together with hydrogen through said reaction chambers, removing another portion of the separated catalyst particles from the closed system by passing them into one end of a conduit which communicates at its opposite end with a regenerator operating at atmospheric pressure, introducing gas into the conduit to control the flow of catalyst through the conduit, maintaining the catalyst particles suspended in the gas during the entire period of passage through the conduit, directing catalyst issuing from the opposite end of the conduit downward into a fluid bed of catalyst particles in the regenerator, regenerating these catalyst particles by combustion at approximately atmospheric pressure and reintroducing these regenerated catalyst particles into the reaction chambers.

5. A cyclic catalytic operation for converting a high boiling hydrocarbon which contains residual components into lower boiling hydrocarbons wherein the catalyst, during each cycle, is treated with hydrogen to remove carbonaceous deposits therefrom, which process comprises introducing particles of hydrogenating catalyst which are suspended in vapor of the high boiling hydrocarbon and hydrogen and which contain a substantial amount of absorbed liquid hydrocarbon into the lower part of a reaction chamber which is maintained under destructive hydrogenation conditions, preventing substantial repeated contact of catalyst particles with fresh high boiling hydrocarbons during a single cycle by maintaining, at the hydrocarbon charging zone, a linear velocity of the gas and vapors above the velocity of reverse flow of the catalyst particles, removing treated hydrocarbon vapors and unreacted hydrogen together with catalyst particles from the top of the reaction chamber, separating these removed catalyst particles from the treated hydrocarbon vapors and hydrogen, treating at least part of the separated catalyst particles with hydrogen at a temperature which will cause destructive hydrogenation of carbonaceous material deposited on the catalyst particles, again passing these catalyst particles and fresh high boiling hydrocarbon together with hydrogen through said reaction chamber, maintaining the recycled catalyst particles during the entire cyclic operation at substantially the pressure which exists in the reaction chamber, passing part of the separated catalyst particles into one end of a conduit communicating with a regenerator at a substantially lower pressure, adjusting the density of the particles in the conduit by introducing gas into the conduit, maintaining the catalyst particles suspended in said gas during the entire period of passage through the conduit, removing the catalyst particles from the other end of the conduit, regenerating these catalyst particles and returning them to the reaction chamber for re-use in the process.

6. A catalytic operation for converting a high boiling hydrocarbon which contains residual components into lower boiling hydrocarbons wherein part of the catalyst is recirculated while it is at all times within a closed system at elevated pressure and wherein the catalyst, during each cycle, is treated with hydrogen to remove carbonaceous deposits therefrom, which process comprises introducing the high boiling hydrocarbon while partly in liquid and partly in vapor phase into a stream of hydrogenating catalyst particles suspended in hydrogen which stream is moving at a speed greatly in excess of speed at which a substantial amount of the particles flow in a reverse direction as a result of gravitational influence, passing this rapidly moving stream of particles of hydrogenating catalyst suspended in vapor of the high boiling hydrocarbon and hydrogen into the lower part of a reaction chamber under destructive hydrogenation conditions, decreasing the speed of passage through the reaction chamber to an extent sufficient to form a dense phase of catalyst throughout substantially the height of the reactor, removing treated hydrocarbon vapors and unreacted hydrogen together with catalyst particles from the top of the reaction chamber, separating these removed catalyst particles from the treated hydrocarbon vapors and hydrogen, treating the separated catalyst particles with hydrogen at a temperature which will cause destructive hydrogenation of carbonaceous material deposited on the catalyst particles, re-using most of these catalyst particles in the operation defined above, passing a minor part of the separated catalyst particles into one end of a conduit communicating with a regenerator at a substantially lower pressure, adjusting the density of the particles in the conduit by introducing gas into the conduit, maintaining the catalyst particles suspended in said gas during the entire period of passage through the conduit, removing the catalyst particles from the other end of the conduit by ejecting them at high velocity into a dense bed of catalyst particles undergoing regeneration, regenerating these ejected catalyst particles and returning them to the reaction chamber for re-use in the process.

7. The method for transporting solid particles suspended in a gas from a closed high pressure chamber to a system at a substantially lower pressure without employing valves or moving parts to control the rate of transport which process comprises introducing the suspension of the solid particles in a gas into the forepart of an elongated confined passageway, such introduction being accomplished substantially by the pressure existing in the high pressure chamber, adjusting the density of the suspension by introducing a gas into the forepart of the passageway, which gas is at a pressure below that in the high pressure chamber, passing the suspension of particles and gas through the passage substantially entirely by the force exerted by the high pressure existing in the closed chamber from which the solid particle suspension originates, maintaining the solid particles suspended in the gas during the entire period of travel of the solid particles through the passageway, progressively decreasing the pressure as the suspension moves through the passageway by friction between the walls of the passageway and the suspension of solid particles and removing the suspension from the opposite end of the passageway.

8. The method for transporting solid particles suspended in a gas from a closed high pressure chamber to a system at a substantially lower pressure without employing valves or moving parts to control the rate of transport which process comprises introducing the suspension of the solid particles in a gas into the forepart of an elongated confined passageway, such introduction being accomplished substantially by the pressure existing in the high pressure chamber, adjusting the density of the suspension by introducing a gas into the forepart of the passageway, which gas is at a pressure below that in the high pressure chamber, passing the suspension of particles and gas through the passage substantially entirely by the force exerted by the high pressure existing in the closed chamber from which the solid particle suspension originates, maintaining the solid particles suspended in the gas during the entire period of travel through the passageway, progressively decreasing the pressure as the suspension moves through the passageway by friction between the walls of the passageway and the suspension of solid particles and directing a stream of the suspension issuing from the opposite end of the passageway into a fluidized dense phase of the same solid particles maintained at a substantially lower pressure.

References Cited in the file of this patent

UNITED STATES PATENTS

| | | |
|---|---|---|
| 2,472,844 | Munday et al. | June 14, 1949 |
| 2,517,900 | Loy | Aug. 8, 1950 |
| 2,585,238 | Gerhold | Feb. 12, 1952 |
| 2,700,015 | Joyce | Jan. 18, 1955 |
| 2,726,135 | Davis | Dec. 6, 1955 |